Aug. 22, 1967     C. L. MADDEN, JR     3,336,817

BICYCLE STEERING WHEEL

Filed June 23, 1965

Clarence L. Madden, Jr.
INVENTOR.

BY *Clarence A. O'Brien*
*and Harvey B. Jacobson*
Attorneys

United States Patent Office 3,336,817
Patented Aug. 22, 1967

3,336,817
BICYCLE STEERING WHEEL
Clarence L. Madden, Jr., Bossier City, La.
(260 Ockley Drive, Shreveport, La. 71105)
Filed June 23, 1965, Ser. No. 466,191
4 Claims. (Cl. 74—552)

The present invention relates to a bicycle, more particularly, the usual steerable front wheel and wherein the steering and controlling thereof is accomplished by a steering wheel rather than the customarily used handlebars.

The herein disclosed concept has to do, more explicitly stated, with the idea of dispensing with the customarily utilized dual-grip handlebar, using a steering wheel in lieu thereof, and providing adapter means which makes practical the appropriation and use of a steering wheel.

In carrying out the principles of the present invention, and as will be hereinafter more fully clarified, the usual handlebar is simply detached from the clamp at the top of the motion transmitting stem. Adapter means is employed which aptly fits into the clamp, making it unnecessary to resort to any changes or alterations in the stock or existing parts.

To the ends desired the steering wheel will be elevated and propped atop the adapter means. The adapter means comprises a vertically elongated extension, the lower end of the extension fitting with requisite nicety and certainty into the usual stem clamp and the upper end being designed and adapted to facilitate secure attachment of the hub portion of the steering wheel thereto.

It is pointed out at the inception of the disclosure that two embodiments of the invention are provided. Each embodiment may be regarded as a readily applicable and removable attachment; that is, an attachment which, generically construed, comprises a steering wheel having a rim, hub, spokes joining the hub to the rim and said hub provided with means which is connectible to the adjacent upper end of a vertically elongated extension or rod, the lower end of the rod being fashioned to orient and coordinate itself with the clamp on the aforementioned stem.

With respect to the structural and functional distinctions which differentiate the alternately usable embodiment or adaptations these will be revealed with particularity in the detailed description which will follow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
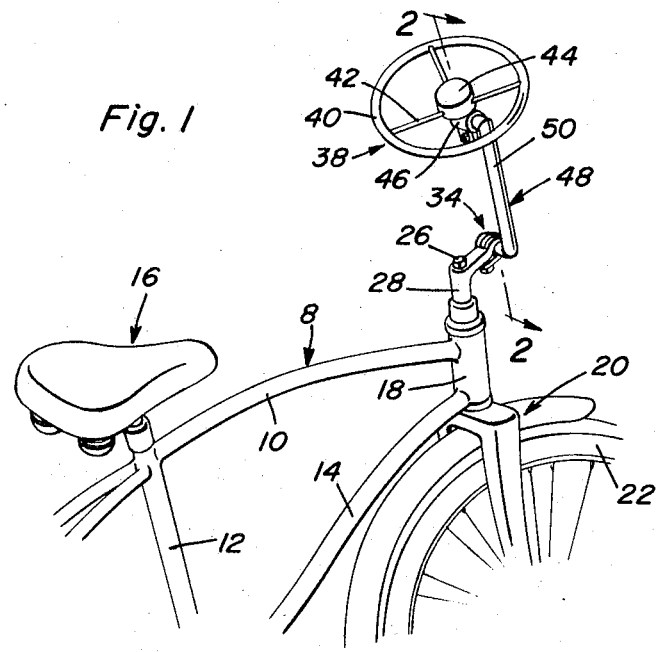
FIGURE 1 is a view in perspective showing the essentials of the forward portion of a conventional bicycle and illustrating with particularity the novel steering wheel and its mounting and attaching means.

Reference to FIGURE 1 will be made in respect to both embodiments or forms of the invention. Each embodiment may be regarded as a more or less self-contained attachment which is capable of being installed and readied for use on the forward portion of the bicycle structure without requiring any alteration in the stock or conventional parts. With further reference to FIG. 1, the numeral 8 designates a frame structure characterized by the customary top horizontal part 10 and companion rearward vertical bar 12 and diagonal bar or frame member 14. The seat structure, which is conventional, is denoted at 16. The leading or forward ends of the bars 10 and 14 are integrally joined with a steering column (the usual sleeve or barrel type) which is denoted at 18. The usual front fork 20 carrying the front steerable wheel 22 is provided at its upper bight portion with a shank 24 screwthreaded to accommodate an assembling and retaining nut 26, the shank extending through the usual axially turnable hollow stem 28 mounted in bushing or bearing means 30 provided therefor in the cylindrical column 18.

Figure 3:
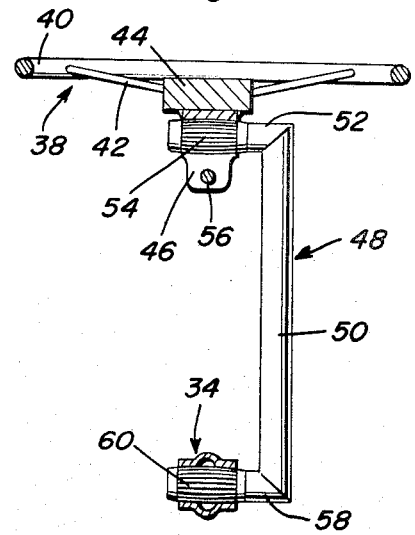
FIGURE 3 is a section on the plane of the vertical section line 3—3 of FIGURE 2.
Figure 2:
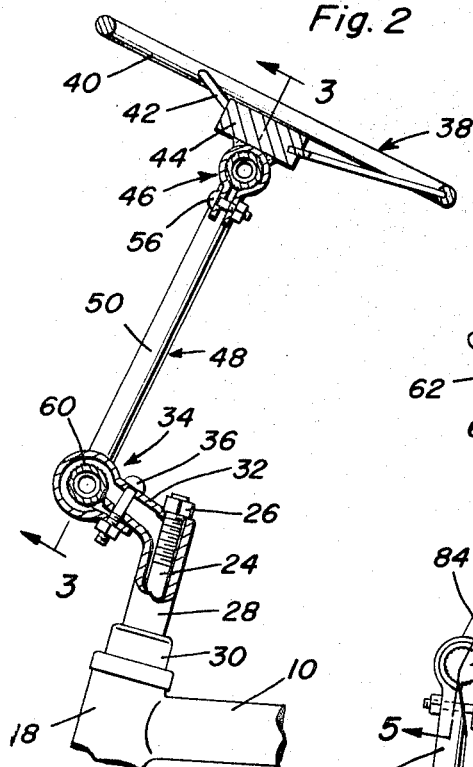
FIGURE 2 is a view on an enlarged scale with parts in section and elevation taken approximately on the plane of the section line 2—2 of FIGURE 1.

With continuing reference to these now somewhat standardized old components and with further reference to FIG. 2 it will be seen that the upper end of the hollow stem 28 has a lateral branch 32 which terminates in a handlebar clamp 34 which is applied and secured by bolt and nut means 36. Under normal circumstances a dualgrip or equivalent handlebar (not shown) would be employed and the median portion would be secured in the clamping means 34 and the bolt 36 would be tightened. In the present instance the handlebar is omitted and the steering-wheel-type attachment is substituted therefor. The form of the attachment appearing in FIGS. 1 to 3 comprises an approriate steering wheel 38 having an annular or ring-like rim 40 with spokes 42 radiating therefrom and joined at their inner ends to a solid hub 44 which is provided on its underneath side with a clamp 46 for the adapter means. This means in the form of the invention under consideration comprises a generally U-shaped extension-type unit 48, more particularly, a vertically elongated rod 50 (which in practice will vary in length) having a lateral branch 52 at the top whose free end portion is milled, knurled or otherwise roughened as at 54 and thus is accommodatingly fitted and securely held in the hub clamp 46. The clamp is provided with a suitable bolt and nut denoted generally at 56. The intermediate or bight portion is of suitable vertical length to position the steering wheel 38 at the height or level desired relative to the frame and seat means. The lower lateral branch 58 is provided with a knurled or roughened terminal end 60 which is such in diameter, length and construction that it can be fitted removably but securely in the handle bar clamp 34 and bolted in place as shown.

Figure 5:
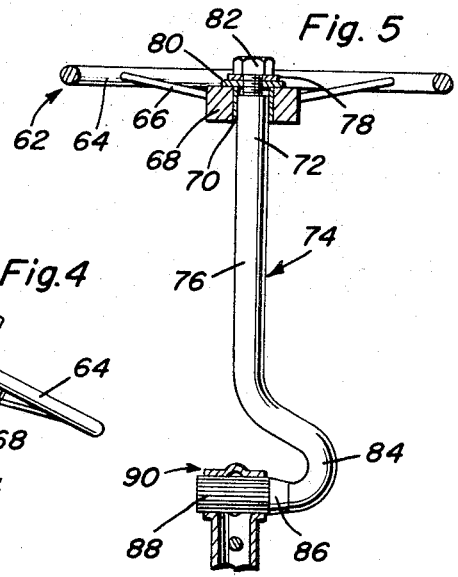
FIGURE 5 is a view on a slightly enlarged scale with parts appearing in section and elevation and taken on the plane of the irregular section line 5—5 of FIGURE 4
Figure 4:
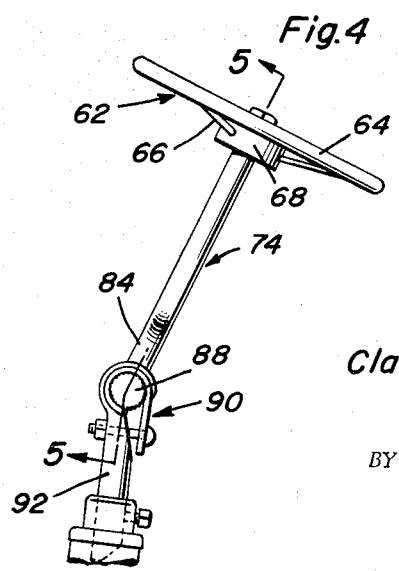
FIGURE 4 is a view in elevation of the modification appearing in FIG. 5 and observing the components thereof in a direction from left to right.

In the modification appearing in FIGS. 4 and 5 the component parts are much the same in construction as those already described. More specifically the steering wheel here is denoted by the numeral 62 and comprises an annular rim 64 with spokes 66 joined at their inner ends to a hub 68 which is centrally apertured and provided or lined with a friction bushing 70. This bushing is jammed over the upper end portion 72 of a generally J-shaped adapter rod 74. The rod proper, which will be of suitable length and cross-section, is denoted at 76 and has its upper end reduced and screw-threaded as at 78 to accommodate washers 80 and an assembling and clamping nut 82. The lower bent end portion 84 has a branch 86 which is knurled or splined or otherwise fashioned at 88 and is secured in the clamp 90 atop the stem 92 as shown in FIG. 4.

It will be clear from the views of the drawing and the specification that the concept is unique in that it serves to provide a steering wheel in lieu of handle bars and utilizes simple, economical and practical component parts which can be put together to provide a ready-to-install steering attachment, more particularly an acceptable substitute for the customarily used handlebars. To the ends desired novelty is predicated on a readily attachable and detachable adapter unit which lends itself to use in conjunction with the usual clamp atop the axially turnable stem of the fork structure. In both instances, the steering wheel is the same in that it embodies a hub with a clamp or of an alternative type (FIG. 5) which is attachable to an upper threaded end portion of the extension or rod which is the main part of the adapter unit. More specifically, the lower end of the rod in each unit is milled or otherwise equivalently constructed for connection with an existing form of a clamp.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An attachment for a handlebar clamp such as is used in mounting a handlebar on the forward end of a bicycle frame comprising a substantially U-shaped adapter having an elongated rod portion, provided at a lower end with a laterally directed branch terminating in a milled portion adapted to fit into the aforementioned clamp when in use, the upper end portion having a lateral branch also having a milled terminal portion, a steering wheel having a central hub, said hub having a depending clamp and said clamp being detachably connected to said last-named milled portion.

2. A steering wheel attachment for a clamp such as is used for the mounting of a handlebar on the forward end of a bicycle frame comprising a substantially J-shaped rod constituting an adapter unit, the latter having a crook at a lower end having a terminal milled portion adapted to be fitted removably in a clamp, the upper end having a reduced screw-threaded shank provided with an assembling and retaining nut, and a steering wheel having a rim and a hub portion, said hub portion being centrally apertured and provided with a bushing fitting over said rod and secured in place thereon.

3. An attachment for a handlebar clamp such as is commonly used to mount a handlebar on the forward end portion of a conventional type bicycle frame comprising a one-piece hollow tubular U-shaped adapter embodying (1) a vertically elongated rod portion (2) a lateral horizontally directed lower end terminating in a portion capable of being detachably fitted and clampingly adjustably secured in the aforementioned clamp (3) a lateral upper end portion coplanar with said rod portion and lower end, and a steering wheel having a central hub, said hub being provided on an underneath side with a depending clamp which is detachably connected to the coacting terminal portion of said lateral upper end portion.

4. A steering wheel attachment which is capable of being attached intact to a clamp of the type such as is used for mounting a handlebar on the forward end of a bicycle frame comprising a J-shaped adapter embodying an elongated rod portion having significantly distinct upper and lower ends, said lower end embodying a laterally offset crook and said crook embodying a terminal portion which is capable of being adaptably and retentively but removably fitted in and held in place by said handlebar clamp, said upper end being linearly straight and axially aligned with said rod and embodying means capable of attaching and operatively retaining a steering wheel, and a steering wheel having a rim and a hub portion joined to said rim by radial circumferentially spaced spokes, said hub portion being centrally apertured and provided with a bushing which is fitted over the upper end of said rod and is operatively secured in place thereon by said steering wheel retaining means.

References Cited

UNITED STATES PATENTS

| 671,647 | 4/1901 | Field | 74—551.6 |
| 973,806 | 10/1910 | Noble | 74—552 |
| 1,130,933 | 3/1915 | Rupert | 74—552 |
| 1,597,815 | 8/1926 | Myers | 74—552 |

FOREIGN PATENTS

| 420,084 | 4/1947 | Italy. |

KENNETH H. BETTS, *Primary Examiner.*